(12) United States Patent
Krüger et al.

(10) Patent No.: US 7,891,463 B2
(45) Date of Patent: Feb. 22, 2011

(54) ACTIVE MUFFLER

(75) Inventors: Jan Krüger, Neuhausen (DE); Frank Castor, Stuttgart (DE); Manfred Müller, Baltmannsweiler (DE); Georg Wirth, Kirchheim/Teck (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 0 days.

(21) Appl. No.: 12/421,003

(22) Filed: Apr. 9, 2009

(65) Prior Publication Data

US 2009/0255754 A1    Oct. 15, 2009

(30) Foreign Application Priority Data

Apr. 9, 2008    (DE) .................. 10 2008 018 085

(51) Int. Cl.
- *F01N 1/06* (2006.01)
- *F01N 13/08* (2006.01)
- *A61F 11/06* (2006.01)
- *G10K 11/16* (2006.01)

(52) U.S. Cl. .............. 181/206; 181/228; 381/71.5; 381/71.7

(58) Field of Classification Search ......... 181/206, 181/228; 381/71.5, 71.7
See application file for complete search history.

(56) References Cited

U.S. PATENT DOCUMENTS

| | | | | |
|---|---|---|---|---|
| 4,177,874 A | * | 12/1979 | Angelini et al. ............. | 181/206 |
| 5,044,464 A | * | 9/1991 | Bremigan .................... | 181/206 |
| 5,229,556 A | | 7/1993 | Geddes | |
| 5,233,137 A | * | 8/1993 | Geddes ........................ | 181/206 |
| 5,255,321 A | * | 10/1993 | Murray et al. .............. | 381/71.7 |
| 5,336,856 A | * | 8/1994 | Krider et al. ................ | 181/206 |
| 5,343,533 A | | 8/1994 | Geddes | |
| 5,432,857 A | * | 7/1995 | Geddes ........................ | 381/71.7 |
| 5,446,249 A | * | 8/1995 | Goodman et al. ........... | 181/206 |
| 5,466,899 A | * | 11/1995 | Geisenberger .............. | 181/206 |
| 5,513,266 A | * | 4/1996 | Zuroski ...................... | 381/71.5 |
| 5,541,373 A | * | 7/1996 | Cheng ......................... | 181/206 |
| 5,550,334 A | * | 8/1996 | Langley ...................... | 181/206 |
| 5,574,264 A | * | 11/1996 | Takemori et al. ............ | 181/206 |

(Continued)

FOREIGN PATENT DOCUMENTS

DE    197 51 596 A1    6/1999

(Continued)

*Primary Examiner*—Lincoln Donovan
*Assistant Examiner*—Christina Russell
(74) *Attorney, Agent, or Firm*—Reinhart Boerner Van Deuren, P.C.

(57) ABSTRACT

The present invention to an active muffler for an exhaust gas system of an internal combustion engine, in particular in a motor vehicle, includes a multi-shell housing having a pot-shaped top shell and a pot-shaped bottom shell, a funnel-shaped sound conducting body, which is inserted into the bottom shell and has a connection passing through the bottom shell and out of the housing, a loudspeaker, which is situated in the top shell and is attached to a flange section of the sound conducting body at a distance from the connection, such that a free inside cross section of the sound conducting body surrounded by the flange section is closed with an airtight seal, and a bypass through which an interior space of the top shell is connected to an interior space of the bottom shell so they communicate.

24 Claims, 5 Drawing Sheets

U.S. PATENT DOCUMENTS

| | | | | |
|---|---|---|---|---|
| 5,600,106 | A * | 2/1997 | Langley | 181/206 |
| 5,619,020 | A * | 4/1997 | Jones et al. | 181/206 |
| 5,693,918 | A * | 12/1997 | Bremigan et al. | 181/206 |
| 6,005,957 | A * | 12/1999 | Meeks | 381/386 |
| 6,072,880 | A * | 6/2000 | Shipps et al. | 381/71.5 |
| 6,160,892 | A * | 12/2000 | Ver | 381/71.5 |
| 6,684,977 | B2 * | 2/2004 | Stuart | 181/206 |
| 2006/0037808 | A1 * | 2/2006 | Kruger et al. | 181/206 |
| 2007/0062756 | A1 * | 3/2007 | Seibt et al. | 181/206 |
| 2007/0205043 | A1 * | 9/2007 | Krueger et al. | 181/206 |
| 2008/0053747 | A1 * | 3/2008 | Krueger et al. | 181/206 |

FOREIGN PATENT DOCUMENTS

| | | |
|---|---|---|
| DE | 10 2006 042 224 B3 | 1/2008 |
| EP | 0373188 A1 | 6/1990 |
| EP | 0 674 097 A1 | 9/1995 |
| EP | 674097 A1 * | 9/1995 |
| EP | 0 755 045 A2 | 1/1997 |
| EP | 0 916 817 A2 | 5/1999 |
| EP | 0 939 393 A2 | 9/1999 |
| EP | 1 055 804 A1 | 11/2000 |
| EP | 1 627 996 A1 | 2/2006 |
| JP | 60022010 A | 2/1985 |
| JP | 9088546 A | 3/1997 |

* cited by examiner

ACTIVE MUFFLER

CROSS-REFERENCE TO RELATED PATENT APPLICATIONS

This patent application claims the benefit of co-pending German Patent Application No. DE 102008018085.8, filed on Apr. 9, 2008, the entire teachings and disclosure of which are incorporated herein by reference thereto.

FIELD OF THE INVENTION

The present invention relates to an active muffler for an exhaust gas system of an internal combustion engine, in particular in a motor vehicle. The invention also relates to an exhaust gas system equipped with such an active muffler for an internal combustion engine, in particular in a motor vehicle.

BACKGROUND OF THE INVENTION

Active mufflers work with anti-noise, which is actively generated by at least one loudspeaker and can be used by phase cancellation to attenuate, i.e., suppress certain frequencies, e.g., to reduce noise emission into the environment by an exhaust gas system of an internal combustion engine.

Active mufflers are known, for example, from U.S. Pat. No. 5,600,106, for U.S. Pat. No. 5,233,137, from EP 1 055 804, for U.S. Pat. No. 5,336,856, from EP 0 755 045, from U.S. Pat. No. 5,343,533, from EP 1 627 996, from U.S. Pat. No. 4,177,874, from U.S. Pat. No. 5,229,556, from U.S. Pat. No. 5,432,857, from EP 0 674 097, from U.S. Pat. No. 5,619,020, from EP 0 916 817, from DE 197 51 596, from EP 0 373 188.

One problem with active mufflers in exhaust gas systems of internal combustion engines is thermal stress on the loudspeaker due to the high exhaust gas temperatures. Whereas traditional loudspeakers are able to operate in a range of 100° C. to 200° C., the exhaust gas temperatures usually amount to 400° C. to 700° C. Therefore, an increased effort is required to prevent overheating of the loudspeaker. Furthermore, when using active mufflers in exhaust gas systems for internal combustion engines, the condensate generated during operation may be problematical. The exhaust gases of an internal combustion engine may have a relatively high moisture content, so that condensate develops on surfaces that are cool in relation to the exhaust, e.g., cooler than 100° C. In particular, condensate may thus develop on the diaphragm of a loudspeaker. Condensate collecting on the loudspeaker can create a burden on the diaphragm, substantially impairing the effect of the loudspeaker and causing it to freeze in the presence of frost, which may ultimately lead to destruction of the loudspeaker. Furthermore, a loudspeaker requires a comparatively large rear volume, in particular when comparatively high sound pressure levels are to be generated in a low-frequency range. However, accommodating such a comparatively large rear volume may lead to substantial design space problems, especially in exhaust gas systems for motor vehicles.

BRIEF SUMMARY OF THE INVENTION

The present invention relates to the problem of providing an improved embodiment for an active muffler of the type defined in the introduction and for an exhaust gas system equipped with it such that it is characterized in particular by the fact that the risk of damage to the muffler due to overheating and/or due to condensation is reduced, while also implementing a comparatively large rear volume.

This problem is solved according to the present invention by the subjects of the independent claims. Advantageous embodiments are the subject of the dependent claims.

One embodiment of the invention is based on the general idea of constructing a housing to hold the loudspeaker in a shell construction with two pot-shaped shells, a funnel-shaped sound conducting body being accommodated in the interior of the housing. This sound conducting body passes out of the housing through the bottom shell with a connection on the one hand, while on the other hand serving to attach the loudspeaker to a flange section. A bypass is provided, bypassing the flange section and allowing a communicating connection between an interior space of the top shell and an interior space of the bottom shell. The volume of the interior of the bottom shell outside of the sound conducting body and the volume of the interior of the top shell apart from the loudspeaker together thus form the rear volume of the loudspeaker. A relatively large rear volume for the loudspeaker can be implemented in this way with a comparatively compact design. The hot exhaust gas may pass through the sound conducting body more or less from the bottom to the diaphragm of the loudspeaker, thereby implementing a certain minimum distance across the sound conducting body and preventing a direct effect of hot exhaust gases on the diaphragm and/or loudspeaker. At the same time, this installation situation ensures that condensate can flow out of the loudspeaker and/or its diaphragm comparatively easily and/or can be removed namely through the sound conducting body. The arrangement of the loudspeaker together with the sound conducting body in a separate housing also makes it possible to position the active muffler especially easily on an exhaust gas system, so that overheating of the loudspeaker can be prevented. For example, it is especially easy to maintain minimum distances from hot lines carrying exhaust gas. Furthermore, the housing may be mounted on the vehicle especially easily, so that it is exposed to the slip stream during operation of the vehicle. Furthermore, the muffler forms a unit that can be prefabricated and can be used more or less universally, regardless of the specific installation situation.

An embodiment in which the sound conducting body in the installed state of the muffler forms a drain in its interior leading from the flange section to the connection is especially advantageous. In this way, condensate that may collect on the diaphragm during operation of the muffler, e.g., on the exhaust end, can be removed from the muffler especially easily.

Said drain can be embodied especially without steps and/or undercuts, thus preventing water from collecting in the muffler and reducing the risk of icing associated with this.

An embodiment in which the housing is designed to be approximately spherical is especially advantageous. For example, the main dimensions, namely height, width and length of the housing, may differ by less than 30% or less than 25% or less than 20%. This essentially spherical shape of the housing yields a relatively large volume in the interior of the housing with a comparatively small surface area which can be utilized in particular as the rear volume for the loudspeaker.

In another advantageous embodiment, it is possible to provide for the flange section to be equipped with several radial protrusions on the outside radially spaced a distance apart in the circumferential direction, supported on the outside radially on an inner side of the bottom shell. This support may be designed in particular with a tight fit and/or a friction fit, such that no additional separate fastening elements, e.g., screws, are necessary for fastening the sound conducting body. This makes it possible to prevent heat bridges between the housing and the sound conducting body, which reduces the transfer of heat to the loudspeaker.

Other features and advantages of the invention are derived from the dependent claims, the drawings and the respective description of the figures with reference to the drawings.

It is self-evident that the features mentioned above and those yet to be explained below may be used not only in the particular combination given but also in other combinations or alone without going beyond the scope of the present invention.

BRIEF DESCRIPTION OF THE DRAWINGS

Preferred exemplary embodiments of the invention are depicted in the drawings and explained in greater detail in the following description, where the same reference numerals refer to the same or similar components or those having the same function.

In the drawings, schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to FIGS. 1 to 4, an active muffler 1 comprises a housing 2, which is designed with multiple shells, preferably two shells, and has at least one top shell 3 and one bottom shell 4 accordingly. The top shell 3 and bottom shell 4 are each designed in the form with a pot shape. On the whole, this yields an essentially spherical shape of the housing 2.

The muffler 1 contains in its housing 2 a sound conducting body 5 which is designed with a funnel shape and has a connection 6 and a flange section 7. The connection 6 serves to connect the muffler 1 to a space or a line in which airborne sound propagates; this sound should be actively suppressed with the help of the muffler 1.

For active sound suppression, the muffler 1 has a loudspeaker 8, which has a conventional design. Accordingly, the loudspeaker 8 has an electromechanical converter 9, which is attached to a cage and may excite a diaphragm 11 to vibration, said diaphragm being stretched over the cage 10. Furthermore, the loudspeaker 8 is electrically operable via electric terminals provided on the loudspeaker 8.

The sound conducting body 5 is used in the bottom shell 4. The bottom shell 4 has an opening 13 through which the connection 6 leads out of the housing 2. The connection 6 thus passes through the bottom shell 4. In contrast with that, the loudspeaker 8 is arranged in the top shell 3 and is attached to the flange section 7 on a side facing away from the connection 6. The loudspeaker 8 is mounted on the flange section 7 in such a way that a free inside cross section of the sound conducting body 5 surrounded by the flange section 7 but not designated more specifically here is thereby sealed in an airtight manner by the loudspeaker 8 and/or its diaphragm 11. To do so, a corresponding gasket (not shown here) may be arranged between the flange section 7 and one edge 14 of the loudspeaker cage 10 with which the loudspeaker 8 is attached to the sound conducting body 5.

The housing 2 has a bypass 31 which bypasses the flange section 7. In the example shown here, the flange section 7 has several recesses 15 for implementation of the bypass 31. These recesses 15 form through-openings. An interior space 16 of the top shell 3 is connected to the interior space 17 of the bottom shell 14, so they communicate via the bypass 31 through these through-openings 15. The interior space 16 of the top shell 3 thus surrounds the loudspeaker 8 while the interior space 17 of the bottom shell 4 surrounds the sound conducting body 5. The two interior spaces 16, 17 together thus form a rear volume for the loudspeaker 8. This rear volume is separated in an airtight manner from the interior of the sound conducting body 5, thereby preventing an acoustic short circuit.

The sound conducting body 5 may expediently be used as a drain for condensate that may form on the exhaust side of the diaphragm 11 during operation. To this end, the flange section 5 is arranged obliquely in its interior, not designated more specifically here, in the installed state, so that liquid collecting on it can run down due to gravity. In this example, the connection 6 has a longitudinal central axis 18, which is inclined by approximately 45° with respect to a plane 19 in which the flange section 7 is situated. Angles of inclination of 30° up to and including 60° between this longitudinal central axis 18 and said plane 19 allow an especially compact design for the bottom shell 4 and thus for the housing 2. However, angles of inclination of up to 90° are essentially also conceivable.

The drain designed in the interior of the sound conducting body 5 is preferably embodied as a design without steps and/or undercuts. An accumulation of water or other liquid in the interior of the sound conducting body 5 and thus in the interior of the housing 2 can be prevented in this way. The risk of ice forming inside the muffler 1 can therefore be reduced.

As already explained, the housing 2 is designed to be essentially spherical. This is achieved, for example, by comparatively minor deviations in the dimensions of the width of the housing 2, the height of the housing 2 and the length of the housing 2. For example, the height, width and length of the housing 2 differ by less than 30%, in particular by less than 25% and preferably by less than 20% from one another. Furthermore, the housing 2 may be designed to be essentially rotationally symmetrical with respect to a vertical axis 20 standing perpendicular to the plane 19 of the flange. This rotational symmetry ends in the area of the opening 13 on the bottom shell 4 and ends in the area of cable connection 21 on the top shell 3. Said cable connection 21 serves to feed electric cable (not shown) through the housing 2 for operation of the loudspeaker 8. An embodiment in which this cable connection 21 is designed, so that it additionally allows an equalization of pressure between the interior space 16 of the top shell 16 and the environment of the housing 2 is especially advantageous. In this way the cable connection 21 has a double function. Alternatively it is likewise possible to mount at least one pressure equalizing opening (not shown here) which may be splash-protected in particular, in the top shell 3 and/or in the bottom shell 4. For example, such a pressure equalizing opening may be sealed with the help of a gas-permeable but liquid-impermeable diaphragm.

For the case when the use of the sound conducting body 5 as a drain is impossible in a special installation situation, the muffler 1 may additionally be equipped with a suction pipe which allows suction removal of condensate out of the interior of the sound conducting body 5. However, such an embodiment is not shown here.

Figure 3:
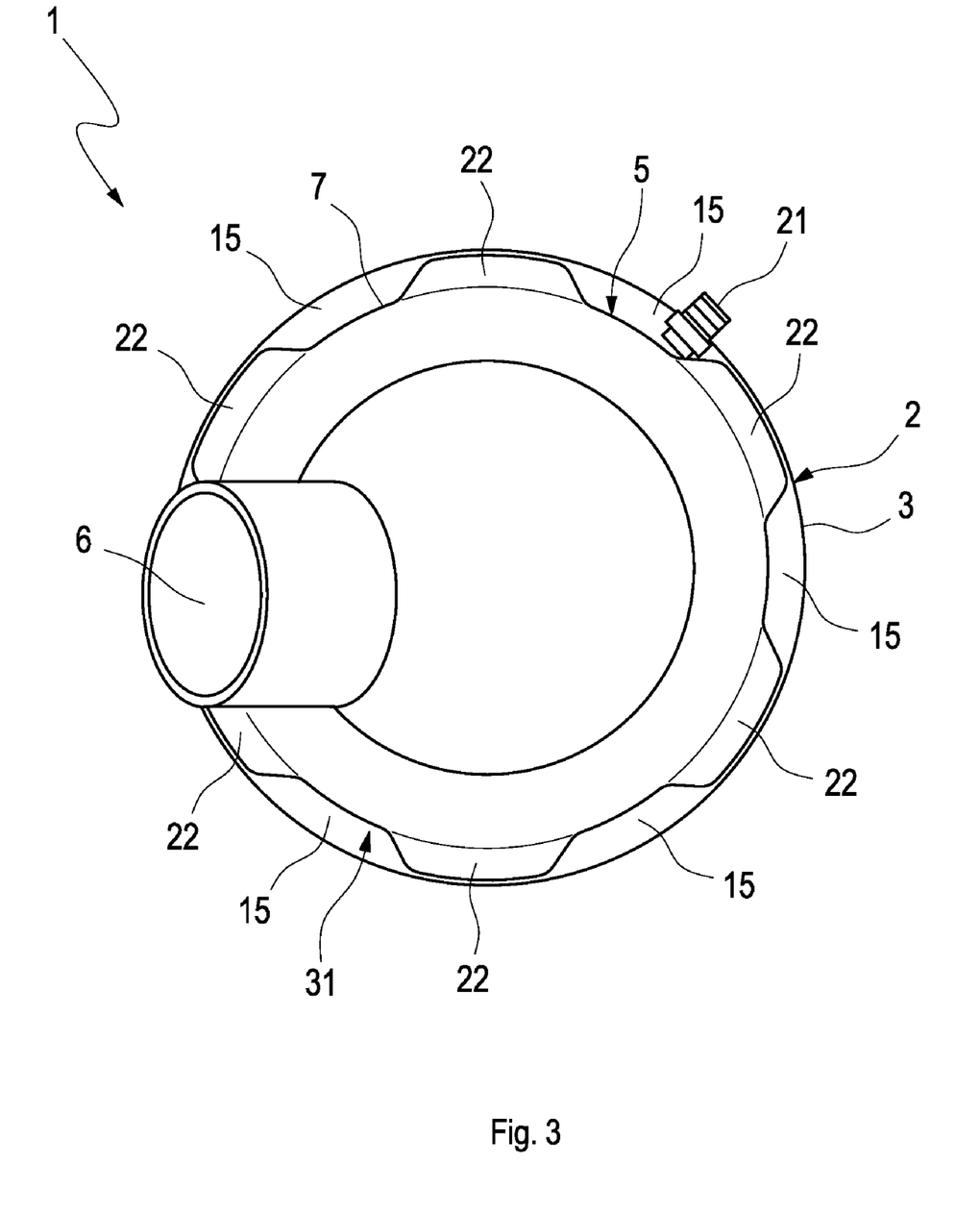
FIG. 3 shows a view of the muffler from underneath with the bottom shell omitted.
Figure 4:
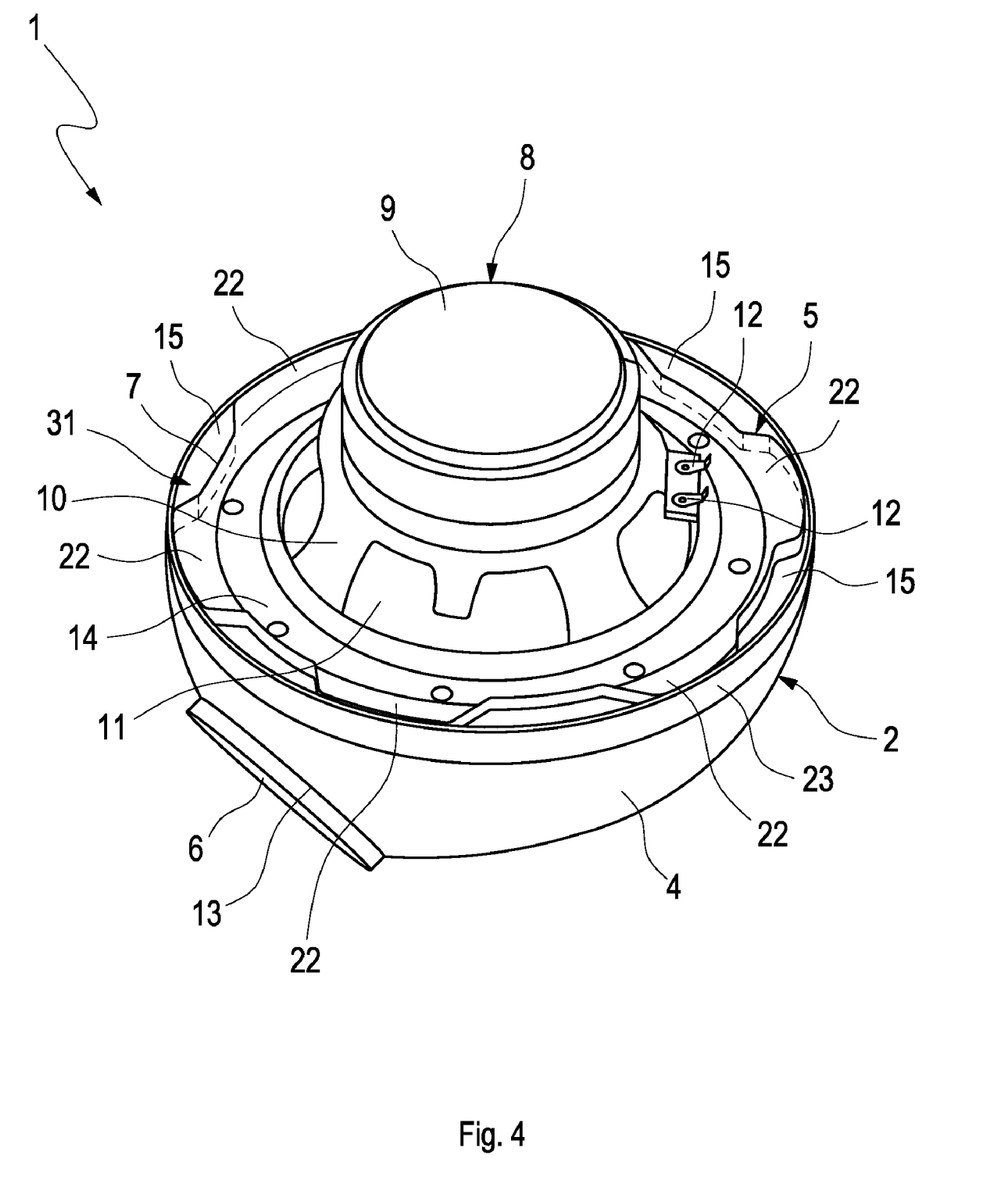
FIG. 4 shows a perspective view of the muffler with the top shell omitted.

The flange section 7 has several protrusions 22 on the outside radially. These are spaced a distance apart from one another in the circumferential direction and protrude radially with respect to the remaining flange section 7. The sound conducting body 5 inserted axially into the bottom shell 4 may be supported via these protrusions 22 on an inner side of the bottom shell 4, which is not designated further here, on the outside radially. It is fundamentally possible to press the flange section 7 into the bottom shell 4 in such a way that said protrusions 22 are radially supported on the bottom shell 4 with a radial prestress. In this way a purely frictionally engaged and/or force-engaged fixation may be implemented for the sound conducting body 5 in and/or on the bottom shell 4. Additionally or alternatively, it is likewise possible to provide an edge section 23 on the bottom shell 4 with a step (not shown here) on which the protrusions 22 come to rest axially. A form-fitting attachment of the sound conducting body 5 on and/or to the bottom shell 4 can be implemented in this way.

To form the bypass 31, the recesses 15 and/or the through-openings 15 are each arranged between two protrusions 22 in the circumferential direction and/or are formed by the distances between neighboring protrusions 22.

Figure 1:
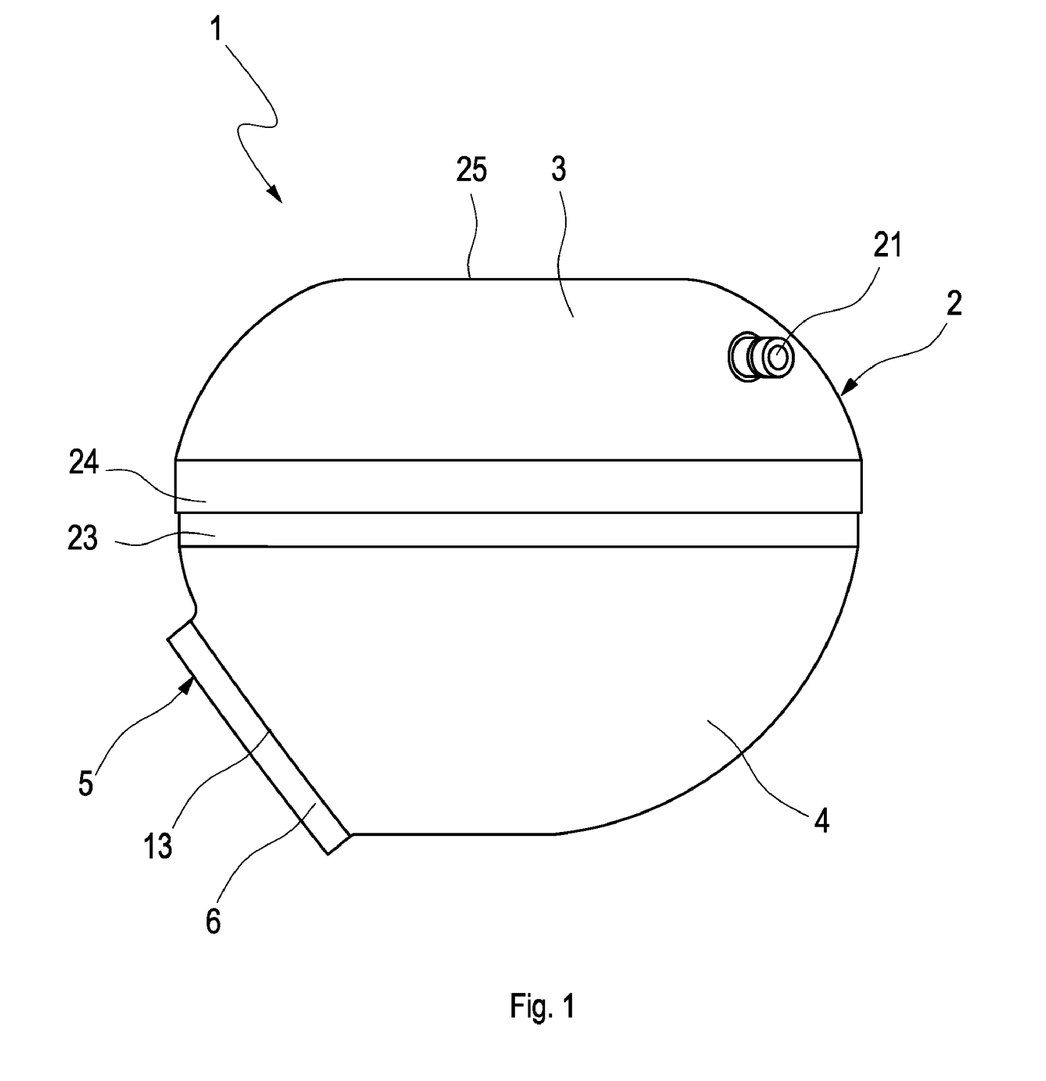
FIG. 1 shows a side view of an active muffler.
Figure 2:
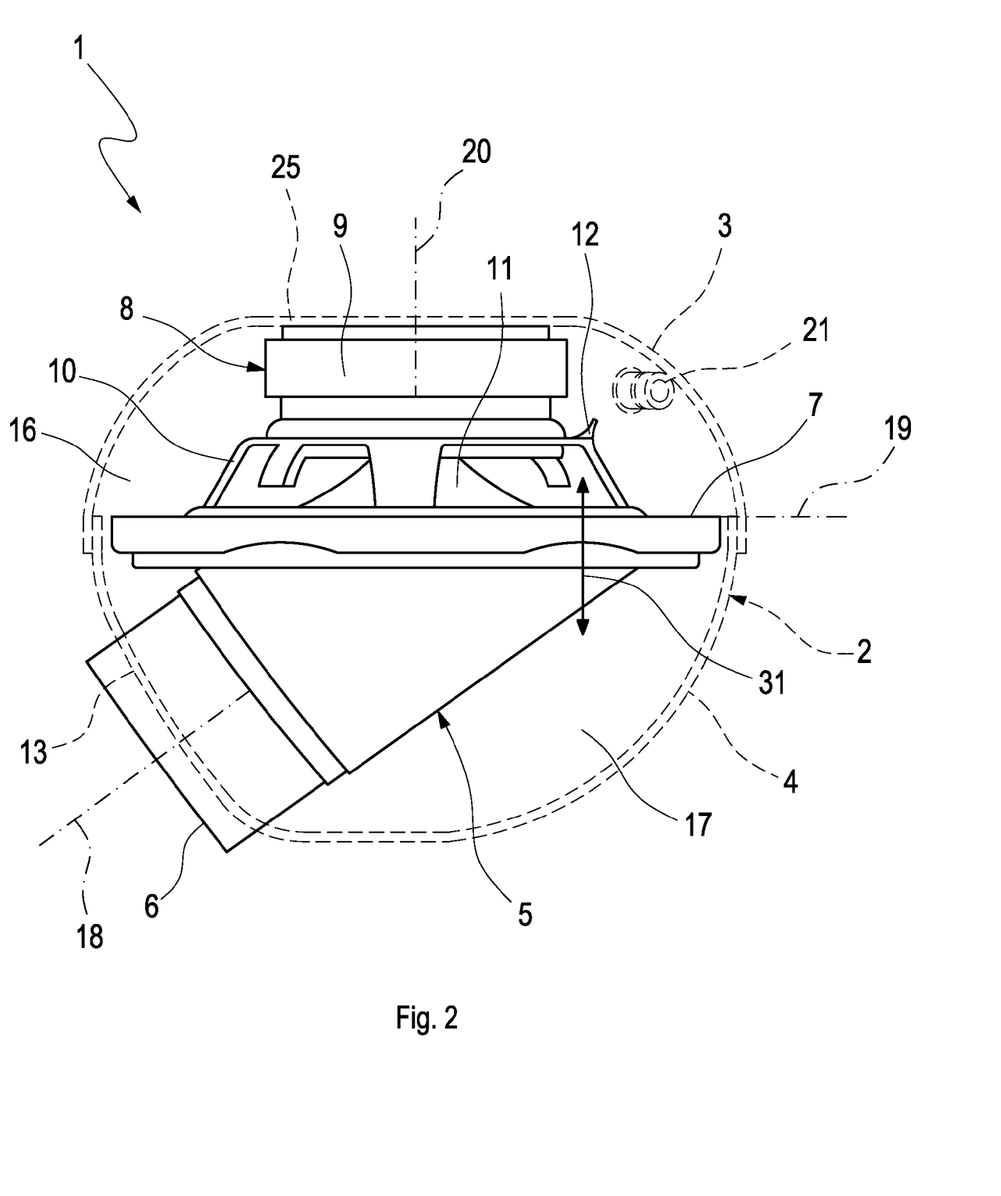
FIG. 2 shows a side view like that in FIG. 1, but with a transparent housing.

With the embodiment shown here, the top shell 3 is attached axially to the bottom shell 4. An edge section 24 of the top shell 3 extends over the aforementioned edge section 23 of the bottom shell 4 on the outside radially here. In addition, quick fastening means (not shown here) may also be provided to secure the top shell 3 on the bottom shell 4.

The top shell 3 in the example shown here has a planar bottom section 25. The dimensions of the top shell 3 and the loudspeaker 8 are expediently coordinated with one another, so that the loudspeaker 8 is supported in particular extensively on the bottom section 25 when the top shell 3 seals the housing 2.

Figure 5:
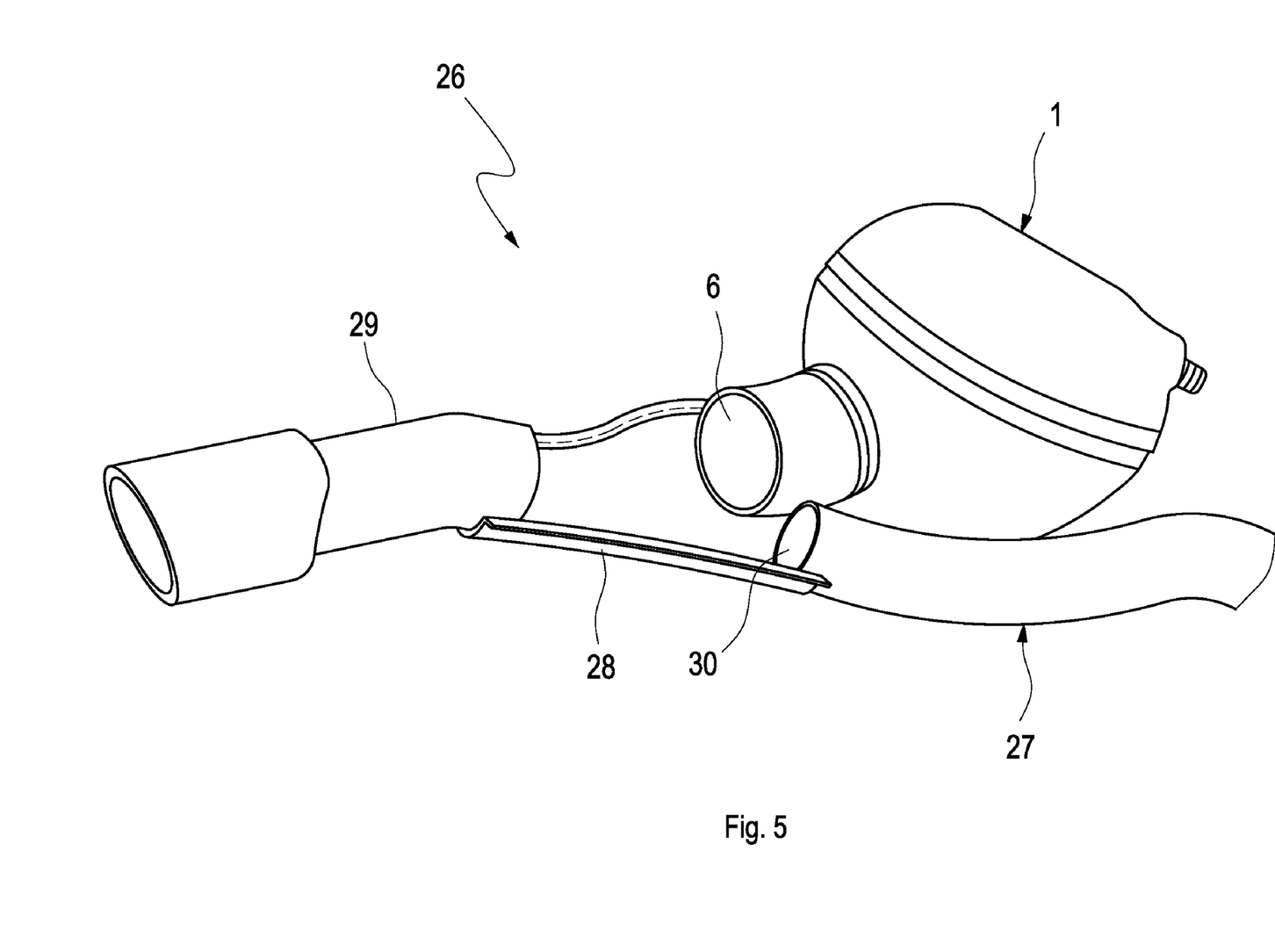
FIG. 5 shows a perspective view of an exhaust gas system with the muffler and with the top shell of a connecting piece omitted.

According to FIG. 5, an exhaust gas system 26, which is shown only partially here and which is used in an internal combustion engine for removing its exhaust, comprises at least one such active muffler 1 as well as a line 27 carrying exhaust gas. The muffler 1 is connected to the line 27 with its connection 6. To this end, the exhaust line 27 has a connecting piece 28, which is shown here in a sectional view, i.e., only half is shown. The connecting piece 28 is designed essentially in a Y shape connecting the line 27 to an tailpipe 29 and also allowing connection of the muffler 1. In the embodiment shown here, the muffler 1 is connected to the exhaust gas system 26 so that the connection 6 is oriented essentially in the same direction as one end 30 of the line 27. A direct influx of hot exhaust gas into the connection 6 and thus a direct exposure of the loudspeaker 8 to hot exhaust can be prevented in this way.

In the example shown here, the muffler 1 is situated relatively close to the tailpipe 29, so this is a so-called rear muffler. The muffler 1 may expediently be mounted on a vehicle floor, so that it is exposed to the slip stream. In addition, baffle elements may be mounted on the vehicle floor, promoting direct exposure of the housing 2 to the slip stream.

The mounting, i.e., arrangement of the muffler 1 on the exhaust gas system 26, is expediently performed in such a way that the housing 2 maintains a predetermined minimum distance of approximately 10 mm to 20 mm from a line carrying exhaust gas, namely from exhaust line 27 here. In addition, the connection 6 has a minimum length, which may be between 100 mm and 200 mm, for example. Overheating of the loudspeaker 8 can be prevented through these measures.

The housing shells 3, 4 may be made of plastic parts, for example. Likewise, they may be molded sheet metal parts. The sound conducting body 5 is preferably a molded sheet metal part, where the sound conducting body 5 may be assembled from multiple individual parts. Likewise, a variant manufactured in one piece is also conceivable.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An active muffler for an exhaust gas system of an internal combustion engine, in particular in a motor vehicle, comprising:
    a multi-shell housing having a pot-shaped top shell and a pot-shaped bottom shell;
    a funnel-shaped sound conducting body which is inserted into the bottom shell and has a connection passing through the bottom shell and out of the housing;
    a loudspeaker, which is situated in the top shell and is attached to a flange section of the sound conducting body, flange section at a distance from the connection, such that a free inside cross section of the sound conducting body surrounded by the flange section is closed with an airtight seal;
    a bypass through which an interior space of the top shell is connected to an interior space of the bottom shell so they fluidly communicate.

2. The muffler according to claim 1, wherein the bypass is formed by recesses in the flange section.

3. The muffler according to claim 1, wherein in the installed state of the muffler, the sound conducting body forms a drain leading from the flange section to the connection in its interior.

4. The muffler according to claim 3, wherein the drain is designed to be without steps and/or undercuts.

5. The muffler according to claim 1, wherein the housing is designed to be spherical, such that the height, width and length of the housing deviate from one another by less than 30%.

6. The muffler according to claim 1, wherein the top shell with an edge section on the outside is placed on an edge section of the bottom shell.

7. The muffler according to claim 1, wherein the top shell has a planar bottom section on which the loudspeaker is supported.

8. The muffler according to claim 1, wherein the top shell has a cable connection by which cables for electric operation of the loudspeaker can be fed through and which is embodied so that it allows an equalization of pressure between the interior of the top shell and the environment of the housing.

9. The muffler according to claim 1, wherein the housing is designed to be spherical, such that the height, width and length of the housing deviate from one another by less than 20%.

10. An active muffler for an exhaust gas system of an internal combustion engine, in particular in a motor vehicle, comprising:
    a multi-shell housing having a pot-shaped top shell and a pot-shaped bottom shell;
    a funnel-shaped sound conducting body which is inserted into the bottom shell and has a connection passing through the bottom shell and out of the housing;
    a loudspeaker, which is situated in the top shell and is attached to a flange section of the sound conducting body, flange section at a distance from the connection, such that a free inside cross section of the sound conducting body surrounded by the flange section is closed with an airtight seal;
    a bypass through which an interior space of the top shell is connected to an interior space of the bottom shell so they communicate; and
    wherein the flange section has several protrusions extending radially on the outside and spaced a distance apart from one another in the circumferential direction, supported on an inside of the bottom shell on the outside radially.

11. The muffler according to claim 10, wherein
    the bypass is formed by recesses in the flange section; and
    one of the recesses is arranged between two neighboring protrusions in the circumferential direction.

12. The muffler according to claim 10, wherein the flange section is pressed into the bottom shell, so that the protrusions are supported on the bottom shell with radial prestress.

13. An exhaust gas system for an internal combustion engine, in particular a motor vehicle, having a line carrying exhaust gas, to which at least one active muffler is connected, said active muffler comprising:
    a multi-shell housing having a pot-shaped top shell and a pot-shaped bottom shell;
    a funnel-shaped sound conducting body which is inserted into the bottom shell and has a connection passing through the bottom shell and out of the housing;
    a loudspeaker, which is situated in the top shell and is attached to a flange section of the sound conducting body, flange section at a distance from the connection, such that a free inside cross section of the sound conducting body surrounded by the flange section is closed with an airtight seal;
    a bypass through which an interior space of the top shell is connected to an interior space of the bottom shell so they fluidly communicate.

14. The exhaust gas system according to claim 13, wherein the bypass is formed by recesses in the flange section.

15. The exhaust gas system according to claim 13, wherein in the installed state of the muffler, the sound conducting body forms a drain leading from the flange section to the connection in its interior.

16. The exhaust gas system according to claim 15, wherein the drain is designed to be without steps and/or undercuts.

17. The exhaust gas system according to claim 13, wherein the housing is designed to be spherical, such that the height, width and length of the housing deviate from one another by less than 30%.

18. The exhaust gas system according to claim 13, wherein the top shell with an edge section on the outside is placed on an edge section of the bottom shell.

19. The exhaust gas system according to claim 13, wherein the top shell has a planar bottom section on which the loudspeaker is supported.

20. The exhaust gas system according to claim 13, wherein the top shell has a cable connection by which cables for electric operation of the loudspeaker can be fed through and which is embodied so that it allows an equalization of pressure between the interior of the top shell and the environment of the housing.

21. The exhaust gas system according to claim 13, wherein the housing is designed to be spherical, such that the height, width and length of the housing deviate from one another by less than 20%.

22. An exhaust gas system for an internal combustion engine, in particular a motor vehicle, having a line carrying exhaust gas, to which at least one active muffler is connected, said active muffler comprising:
    a multi-shell housing having a pot-shaped top shell and a pot-shaped bottom shell;
    a funnel-shaped sound conducting body which is inserted into the bottom shell and has a connection passing through the bottom shell and out of the housing;
    a loudspeaker, which is situated in the top shell and is attached to a flange section of the sound conducting body, flange section at a distance from the connection, such that a free inside cross section of the sound conducting body surrounded by the flange section is closed with an airtight seal;
    a bypass through which an interior space of the top shell is connected to an interior space of the bottom shell so they communicate; and
    wherein the flange section has several protrusions extending radially on the outside and spaced a distance apart from one another in the circumferential direction, supported on an inside of the bottom shell on the outside radially.

23. The exhaust gas system according to claim 22, wherein
    the bypass is formed by recesses in the flange section; and
    one of the recesses is arranged between two neighboring protrusions in the circumferential direction.

24. The exhaust gas system according to claim 22, wherein the flange section is pressed into the bottom shell, so that the protrusions are supported on the bottom shell with radial prestress.

* * * * *